United States Patent
Luo (10) Patent No.: US 8,014,906 B2
(45) Date of Patent: Sep. 6, 2011

(54) MULTI-AXIS TRIM PROCESSING

(75) Inventor: Jia Luo, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 1125 days.

(21) Appl. No.: 11/613,071

(22) Filed: Dec. 19, 2006

(65) Prior Publication Data

US 2008/0147251 A1    Jun. 19, 2008

(51) Int. Cl.
*B64C 13/00* (2006.01)

(52) U.S. Cl. .................. 701/3; 701/12; 701/14; 244/48; 244/200; 244/203

(58) Field of Classification Search .............. 701/3, 12, 701/14; 244/48, 200, 203, 194
See application file for complete search history.

(56) References Cited

U.S. PATENT DOCUMENTS

| | | | | |
|---|---|---|---|---|
| 4,599,698 A * | 7/1986 | Fischer et al. ................. 701/12 |
| 5,366,176 A * | 11/1994 | Loewy et al. ................. 244/99.8 |
| 5,465,211 A * | 11/1995 | Byrne, Jr. ........................ 701/14 |
| 5,722,620 A * | 3/1998 | Najmabadi et al. ............. 244/181 |
| 5,769,359 A * | 6/1998 | Rutan et al. ................... 244/76 R |
| 5,986,580 A * | 11/1999 | Permanne ...................... 340/946 |
| 6,088,633 A * | 7/2000 | Yamamoto ........................ 701/3 |
| 6,134,485 A * | 10/2000 | Tanielian et al. ................ 701/14 |
| 6,158,695 A * | 12/2000 | Najmabadi et al. ........... 244/183 |
| 6,325,333 B1 * | 12/2001 | Najmabadi et al. ........... 244/181 |
| 6,445,333 B1 | 9/2002 | Tanaka |
| 6,453,669 B2 * | 9/2002 | Kennedy et al. ................ 60/527 |
| 6,458,003 B1 * | 10/2002 | Krueger ............................ 440/1 |
| 6,493,689 B2 * | 12/2002 | Kotoulas et al. ................ 706/23 |
| 6,553,333 B1 * | 4/2003 | Shenk ........................... 702/182 |
| 6,751,602 B2 * | 6/2004 | Kotoulas et al. ................ 706/23 |
| 6,769,280 B2 * | 8/2004 | Cao et al. ........................ 72/17.3 |
| 7,010,398 B2 * | 3/2006 | Wilkins et al. .................... 701/3 |
| 7,021,587 B1 * | 4/2006 | Younkin ........................ 244/178 |
| 7,337,623 B2 * | 3/2008 | Fauret ............................ 62/180 |
| 7,424,988 B2 * | 9/2008 | McDonnell ...................... 244/82 |
| 7,624,943 B2 * | 12/2009 | Cerchie et al. ............. 244/17.11 |
| 7,784,741 B2 * | 8/2010 | Cerchie et al. ................ 244/197 |
| 2002/0117579 A1 * | 8/2002 | Kotoulas et al. ............. 244/1 N |
| 2003/0106958 A1 | 6/2003 | Gold et al. |
| 2005/0051666 A1 | 3/2005 | Lee et al. |
| 2008/0147251 A1 * | 6/2008 | Luo .................................. 701/3 |
| 2010/0025544 A1 * | 2/2010 | Beaufrere ................... 244/76 R |

OTHER PUBLICATIONS

European Search Report of Apr. 14, 2008.

* cited by examiner

*Primary Examiner* — Thomas Black
*Assistant Examiner* — Wae Louie
(74) *Attorney, Agent, or Firm* — Haynes & Boone, LLP.

(57) ABSTRACT

Systems and methods are disclosed herein to provide trim for a vehicle, such as an aircraft. For example, a method for providing trim may include generally simultaneously determining values for a plurality of trim variables in a plurality of degrees of freedom. In this manner, the iterative aspect of contemporary methods for providing trim is substantially mitigated and a more efficient, robust system is provided.

21 Claims, 5 Drawing Sheets

FIG. 4

MULTI-AXIS TRIM PROCESSING

TECHNICAL FIELD

This disclosure relates generally to aeronautics and, more particularly, to a method and system for determining trim solutions substantially simultaneously in six degrees of freedom.

BACKGROUND

The flight control surfaces and engine thrust of an aircraft are trimmed to maintain a desired flight condition described by altitude, speed, attitude and heading of the aircraft, as well as to effect some desired changes in altitude, speed, attitude and heading. Typically, the flight control surfaces are trimmed to provide straight and level flight.

Trim may be used to compensate for such factors as imbalances or shifts in load (people, cargo, and fuel) and for winds that would otherwise undesirably alter the altitude, speed, attitude or heading of the aircraft and for thrust asymmetry due to engine failure. For example, trim may be used to compensate for an imbalanced in the weight distribution of cargo that would otherwise cause the aircraft to roll undesirably to one side. Similarly, trim may be used to compensate for a cross wind that would otherwise cause the aircraft to yaw undesirably away from its desired heading.

More particularly, when the aircraft is tending to roll to one side, ailerons and spoilers may be moved to a position that returns the aircraft to level flight. Similarly, if the aircraft is being blown off course, a rudder may be moved so as to maintain the desired heading.

The control surfaces on smaller aircraft may be positioned manually, such as by using pilot operated mechanical systems, e.g., cables and pulleys. However, larger aircraft generally require electric motor or hydraulically operated control surfaces. On some aircraft, such as those with augmented (fly-by-wire) flight control systems, an automated trim system attempts to maintain desired aircraft altitude, speed, attitude and heading with minimal pilot intervention.

Flight simulators are important tools that are extensively used by the airline industry and the military for pilot training and disaster simulation and by aircraft manufacturers for aircraft development. One of the most important aspects of flight simulators is the trim system and method.

Although contemporary trim systems have proven generally useful for their intended purpose, such contemporary systems do suffer from inherent deficiencies that detract substantially from their utility and desirability. This is particularly true for modern aircraft that have highly nonlinear and highly coupled dynamics. It is also particularly true for flight control systems that are augmented.

This is also particularly true when such system follows the p-beta control law, which introduces highly augmented systems and significant system couplings between roll/yaw control and roll/yaw motion. As a result certain trim variables have switched their influences on aircraft motion from one axis to another axis, which has makes it impossible for contemporary trim systems to adjust trim variables.

Trim systems determine trim variables such as angles of attack and sideslip, flight path angle, column input, pedal input, wheel input, and throttle position to drive both angular accelerations (pitch, roll and yaw) and point mass linear accelerations (tangential acceleration and centripetal acceleration) to target values (which are typically zero).

However, the contemporary trim process is a single-axis process. That is, the trim variables are determined one at a time to drive a single acceleration corresponding to a single trim variable. For example, sideslip angle may be used to drive yaw acceleration to zero (thereby maintaining a desired heading). After yaw acceleration has been driven to zero, then a different trim variable may be used to drive its corresponding acceleration to zero, and so on.

In this manner, contemporary trim systems solve for one trim variable by driving one acceleration to its target value at a time. After the trim system determines a trim solution for a first axis or acceleration, then the trim system moves on to a second axis and thus trims the second axis using a different trim variable. However, once trim is achieved along the second axis, the previously trimmed acceleration along the first axis typically becomes untrimmed. Thus, the first axis must be re-trimmed.

The previously trimmed acceleration along the first axis typically becomes untrimmed after trim is achieved along the second axis because of strong couplings of the dynamic systems involved. This undesirable effect necessitates iterative trimming, which is inherently inefficient. That is, each degree of freedom must be repeatedly re-trimmed until all degrees of freedom are within desired tolerances. Such iterative trimming is not desirably robust and often fails to produce a trim solution when the aircraft is near the boundaries of the flight envelope and flight control limits.

One of the flight boundaries is the lowest speed at which an aircraft can remain trimmed with both pedal and wheel input at their mechanical limits. When aircraft is nearing this speed limit at maximum pedal input, the wheel becomes ineffective in controlling rolling moment. Sideslip angle can still effectively control the accelerations in both roll and yaw axes. The contemporary trim systems often fail to find the trim solutions at this boundary.

Further, although the p-beta control laws of some modern aircraft eliminate the lateral acceleration dependency on bank angle, they add a yaw acceleration dependency on the bank angle. This new acceleration dependency shift makes contemporary single axis trim process ineffective.

As a result, there is a need for a trim system that generally simultaneously determines values for trim variables in a plurality of different degrees of freedom so as to substantially mitigate the iterative aspects of contemporary trim systems and thereby enhance efficiency and provide a more robust trim system.

SUMMARY

Systems and methods are disclosed herein to provide trim for a vehicle, such as an aircraft. In accordance with an example of an embodiment, a method for providing trim comprises generally simultaneously determining values for a plurality of trim variables in a plurality of degrees of freedom.

According to an example of an embodiment, a system for providing trim comprises a processor configured to generally simultaneously determine values for a plurality of trim variables in a plurality of degrees of freedom.

According to an example of an embodiment, a system for providing trim comprises means for generally simultaneously determining values for a plurality of trim variables in a plurality of degrees of freedom.

One or more embodiments provide a method and system for providing trim that substantially mitigates the iterative aspects of contemporary trim system and thereby enhances efficiency and provides a more robust trim system.

A more complete understanding of the embodiments will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments and their advantages are best understood by referring to the detailed description that follows. It should be appreciated that like reference numerals are used to identify like elements illustrated in one or more of the figures.

DETAILED DESCRIPTION

An example of an embodiment comprises a method for providing trim wherein a plurality of trim solutions are simultaneously determined in a plurality of degrees of freedom. For example, the trim solutions may be generally simultaneously determined in six degrees of freedom. The trim solution may be determined for both target linear and angular accelerations.

At least one embodiment is suitable for determining trim solutions for aircraft having nonlinear aerodynamics. Multi-axis coupling may be considered in determining the trim solutions. At least one embodiment is suitable for determining trim solutions for an aircraft having a flight control augmentation system.

As used herein, the term "generally simultaneously" is defined to include determining a plurality of trim variables in a manner that facilitates driving a plurality of corresponding accelerations to their target values at approximately the same time. One acceleration does not have to be driven to its target value before the next acceleration is driven to its target value. This may be accomplished, for example, by solving for a plurality of unknowns (trim values) in a plurality of formulas (which characterize the relationship of the trim values to aircraft parameters and to each other).

This is opposed to the contemporary method described above, wherein trim values are defined serially, i.e., the value of one trim variable is determined at a time in a manner that necessitates the recursive recalculation of these variables. That is, a first trim solution is determined (such as by driving a corresponding acceleration to approximately zero), then a second trim solution is determined. After the acceleration corresponding to the second trim solution has been corrected (again, such as by driving the acceleration to zero), then the first trim solution is typically no longer valid and must be solved for again. This process continues recursively until all of the trim values are within desired tolerances.

By determining the trim values generally simultaneously, as is done according to one or more embodiments, the need for such recursion is substantially mitigated or eliminated. Moreover, a plurality (such as all) of the trim values may be determined generally simultaneously and a corresponding plurality of accelerations may be driven to target values generally simultaneously. In this manner, a more efficient and more robust trim system is provided.

Figure 1:
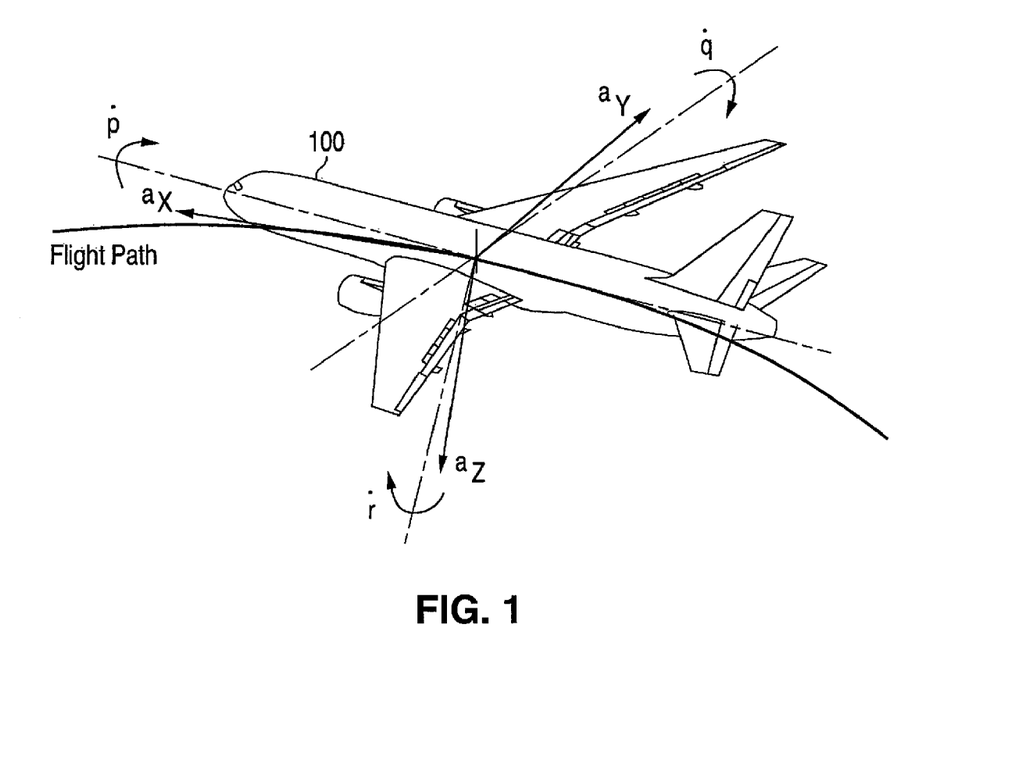
FIG. 1 shows an aircraft and indicates the accelerations that may be controlled according to an example of an embodiment.

FIG. 1 shows an aircraft 100 with the linear and angular accelerations labeled. $\alpha_X$ is the tangential acceleration. $\alpha_Y$ is the lateral centripetal acceleration. $\alpha_Z$ is the vertical centripetal acceleration. $\dot{p}$ is the roll acceleration. $\dot{q}$ is the pitch acceleration. $\dot{r}$ is the yaw acceleration.

One or more of angle of attack, angle of sideslip, aircraft speed, flight path angle, bank angle, drift angle, pitch/roll/yaw control input, engine throttle input, weight, center of gravity, as well as any other desired parameters may be used to drive one or more of tangential acceleration, lateral centripetal acceleration, vertical centripetal acceleration, roll acceleration, pitch acceleration, and yaw acceleration to their target values.

Figure 2A:
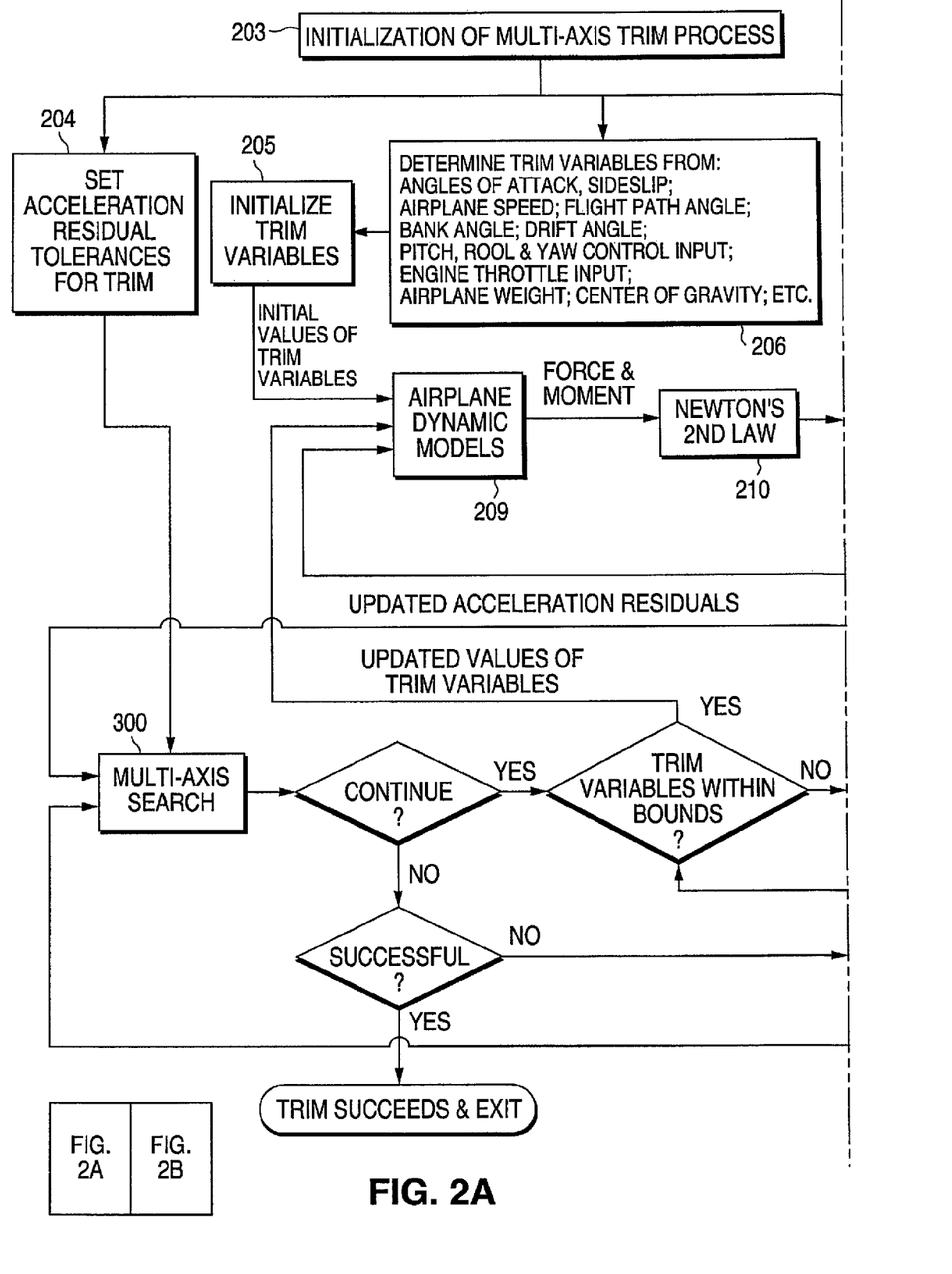
FIGS. 2A and 2B show a flow chart of a multi-axis trim process according to an example of an embodiment of the present.
Figure 2B:
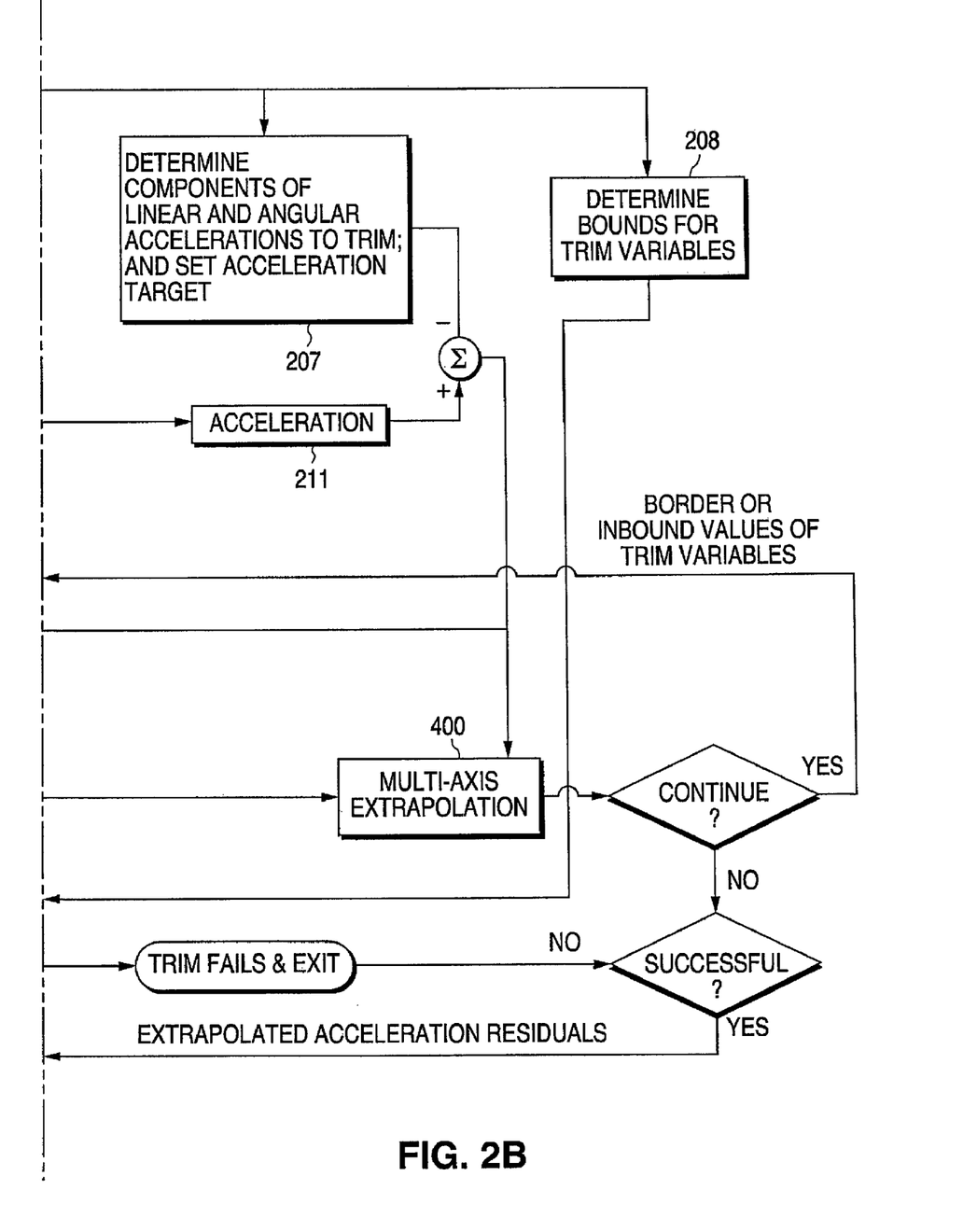

FIGS. 2A and 2B show an overview of the multi-axis trim process according to an example of an embodiment. According to this embodiment, initialization of the multi-axis trim process, as indicated by block 203, comprises blocks 204 thru 208, which are discussed below.

The acceleration residual tolerances are set for trim, as indicated in block 204. The differences between the aircraft acceleration components and their targets have to fall within the acceleration residual tolerances in order to achieve a successful trim.

The trim variables are initialized, as indicated in block 205. To initialize the trim variables, they are typically set values that are representative of the current states of the aircraft 100. They can also be a set of nominal values selected according to types of trim variables and trim objectives.

The trim variables are determined, as indicated in block 206 based on trim objectives. The values of trim variables may be determined by solving a plurality of equations for a plurality of variables, such as by using matrix algebra. The constants of the equations may represent the initial trim values and/or parameters that characterize how the accelerations relate to the trim values. The variables of the equations represent the desired solutions or trim values. The equations may be solved to determine values for the trim variables according to well known matrix algebra rules.

Depending on trim objectives the trim variables may be selected and determined from such parameters as angles of attack and slideslip, aircraft speed, flight path angle, bank angle, drift angle, pitch control input, roll control input, yaw control input, engine throttle input, aircraft weight, and center of gravity, for example.

The components of linear and angular acceleration that affect trim are determined and desired accelerations targets for these values are set, as indicated in block 207. The components of linear and angular acceleration are those actually being experienced by the aircraft at the time that the trim values are being determined.

The acceleration targets are the desired values for these accelerations and result in the aircraft having the desired flight conditions. Typically, the acceleration targets will be zero. Zero acceleration occurs when the aircraft is flying level and the heading is not changing.

However, non-zero acceleration targets are also possible. Non-zero accelerations may occur, for example, when the aircraft is being banked so as to change the heading thereof.

The bounds for the trim variables are determined, as indicated in block 208. The bounds may include the physical limitations of the trim system. For example, the bounds may be defined, at least in part, by the mechanical limits (extent of travel) of the pilot control devices or control surfaces. The bounds may also be determined by the aircraft aerodynamic capabilities and structure limits such as stalling angles of attack and maximum operation speed, etc.

Aircraft dynamic models, which may include couplings, are used as indicated in block 209 to provide force and moment information to a Newton's second law algorithm, as indicated in block 210. The output of the Newton's second law algorithm is provided to an acceleration algorithm, as indicated by block 211. The acceleration algorithm provides accelerations that result from the application of aircraft dynamic models and Newton's second law to the initial values of the trim variables, the border or inbound values of the trim variables, and the updated values of the trim variables.

The acceleration residuals are determined by the differences between these accelerations and their corresponding targets. These acceleration residuals are provided to a multi-axis search algorithm, as indicated by block 300 and a multi-axis extrapolation, as indicated by block 400 and discussed in further detail below.

The acceleration residual tolerances from block 204, the updated acceleration residuals, and the extrapolated acceleration residuals are provided to the multi-axis search algorithm for updating and determining values for the trim variables, as indicated by block 300 and discussed in further detail below.

Figure 3:
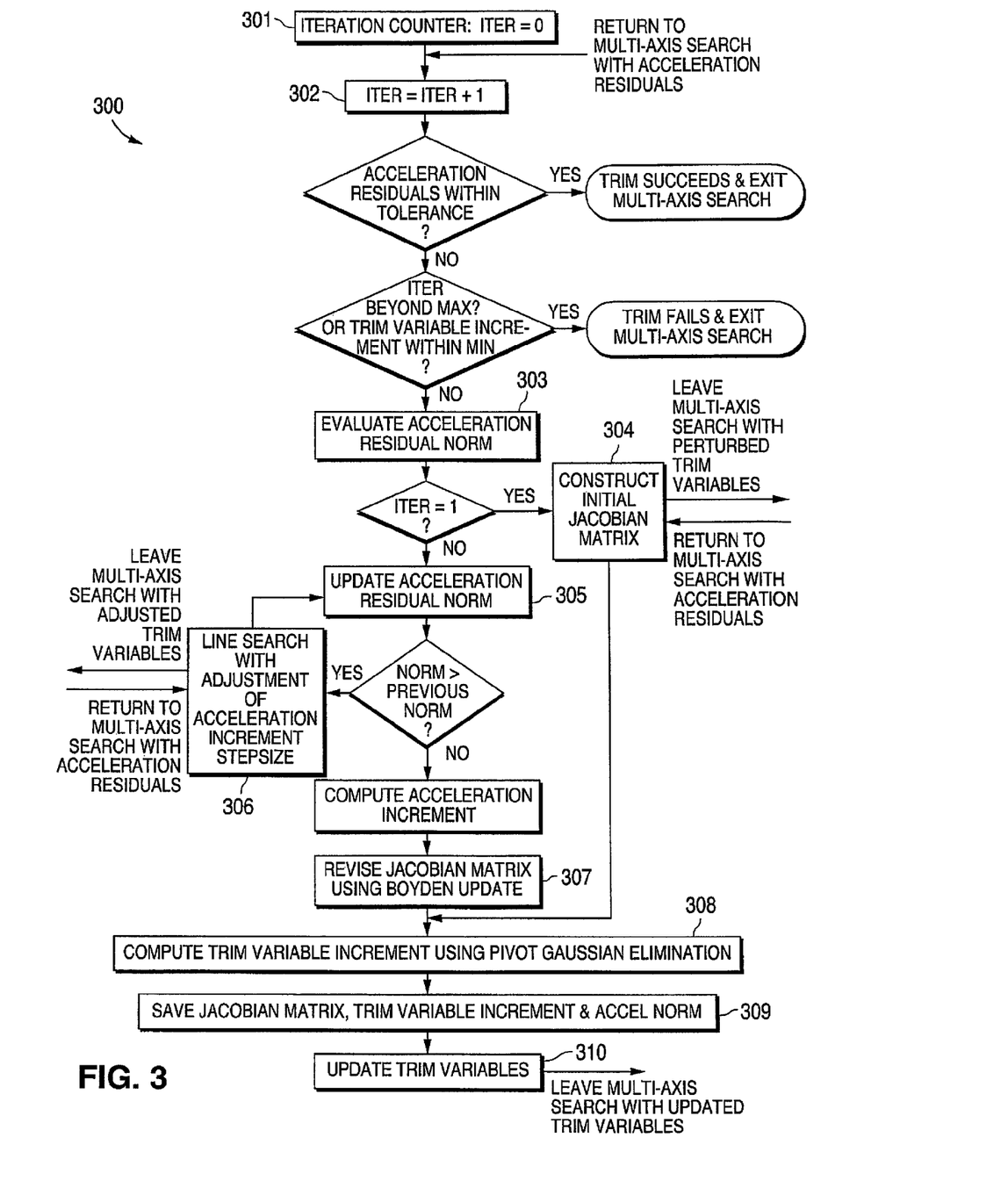
FIG. 3 shows a flow chart of the search process of FIGS. 2A and 2B.

FIG. 3 shows the multi-axis search process 300 of FIGS. 2A and 2B in further detail. This process involves constructing the initial Jacobian matrix and then revising the Jacobian matrix using Broyden's method, as discussed below.

The acceleration residuals are used to determine the updated trim variables according to well-known principles. The trim variable increment may be determined by using Gaussian elimination.

More particularly, an iteration counter is initialized as indicated by block 301 and incremented for each iteration as indicated by block 302.

The acceleration residual norm is valuated, as indicated in block 303. The acceleration residual norm is defined as the square root of sum of the normalized square of all selected acceleration residuals. If all six linear and angular acceleration components are to be trimmed, a norm can be $$N = \sqrt{\left(\frac{a_X - a_X^{TARGET}}{a_X^{TOLERANCE}}\right)^2 + \left(\frac{a_Y - a_Y^{TARGET}}{a_Y^{TOLERANCE}}\right)^2 + \left(\frac{a_Z - a_Z^{TARGET}}{a_Z^{TOLERANCE}}\right)^2 + \left(\frac{\dot{p} - \dot{p}^{TARGET}}{\dot{p}^{TOLERANCE}}\right)^2 + \left(\frac{\dot{q} - \dot{q}^{TARGET}}{\dot{q}^{TOLERANCE}}\right)^2 + \left(\frac{\dot{r} - \dot{r}^{TARGET}}{\dot{r}^{TOLERANCE}}\right)^2}$$

A reduced norm between trim iterations may indicate a converging process in general.

If the iteration counter is equal to one, an initial Jacobian matrix is constructed as indicated in block 304. For illustration purpose without loss of generality, angle of attack $\alpha$, sideslip angle $\beta$, flight path angle $\gamma$, pilot column input $\delta c$, pedal input $\delta p$ and wheel input $\delta w$ are selected as trim variables to trim all six linear and angular acceleration components $$a_X = f_1(\alpha, \beta, \gamma, \delta c, \delta p, \delta w)$$

$$a_Y = f_2(\alpha, \beta, \gamma, \delta c, \delta p, \delta w)$$

$$a_Z = f_3(\alpha, \beta, \gamma, \delta c, \delta p, \delta w)$$

$$\dot{p} = f_4(\alpha, \beta, \gamma, \delta c, \delta p, \delta w)$$

$$\dot{q} = f_5(\alpha, \beta, \gamma, \delta c, \delta p, \delta w)$$

$$\dot{r} = f_6(\alpha, \beta, \gamma, \delta c, \delta p, \delta w)$$

to their targets. The initial Jacobian matrix is constructed using finite difference at the initial values of the trim variables, as follows:

$$J_0 = \begin{bmatrix} \frac{\Delta f_1}{\Delta \alpha} & \frac{\Delta f_1}{\Delta \beta} & \frac{\Delta f_1}{\Delta \gamma} & \frac{\Delta f_1}{\Delta \delta c} & \frac{\Delta f_1}{\Delta \delta p} & \frac{\Delta f_1}{\Delta \delta w} \\ \frac{\Delta f_2}{\Delta \alpha} & \frac{\Delta f_2}{\Delta \beta} & \frac{\Delta f_2}{\Delta \gamma} & \frac{\Delta f_2}{\Delta \delta c} & \frac{\Delta f_2}{\Delta \delta p} & \frac{\Delta f_2}{\Delta \delta w} \\ \frac{\Delta f_3}{\Delta \alpha} & \frac{\Delta f_3}{\Delta \beta} & \frac{\Delta f_3}{\Delta \gamma} & \frac{\Delta f_3}{\Delta \delta c} & \frac{\Delta f_3}{\Delta \delta p} & \frac{\Delta f_3}{\Delta \delta w} \\ \frac{\Delta f_4}{\Delta \alpha} & \frac{\Delta f_4}{\Delta \beta} & \frac{\Delta f_4}{\Delta \gamma} & \frac{\Delta f_4}{\Delta \delta c} & \frac{\Delta f_4}{\Delta \delta p} & \frac{\Delta f_4}{\Delta \delta w} \\ \frac{\Delta f_5}{\Delta \alpha} & \frac{\Delta f_5}{\Delta \beta} & \frac{\Delta f_5}{\Delta \gamma} & \frac{\Delta f_5}{\Delta \delta c} & \frac{\Delta f_5}{\Delta \delta p} & \frac{\Delta f_5}{\Delta \delta w} \\ \frac{\Delta f_6}{\Delta \alpha} & \frac{\Delta f_6}{\Delta \beta} & \frac{\Delta f_6}{\Delta \gamma} & \frac{\Delta f_6}{\Delta \delta c} & \frac{\Delta f_6}{\Delta \delta p} & \frac{\Delta f_6}{\Delta \delta w} \end{bmatrix}$$

As indicated in block 305 if the iteration counter is not equal to one, the acceleration residual norm is updated once at the beginning the iteration and is updated again using the results of each line search with adjustment of trim variable increment step size, as indicated in block 306. This process comprises re-evaluation of acceleration residuals at revised trim values due to their increment step size adjustment until the updated norm is less than the norm from the previous iteration.

The acceleration increment is computed and the Jacobian matrix is then revised using Broyden's update method, as indicated in block 307. The Broyden update is performed by adding an incremental matrix to the Jacobian matrix from previous iteration, $J_i$ as such, $$J_{i+1} = J_i + \frac{(\Delta a_i - J_i \Delta x_i)(\Delta x_i)^T}{(\Delta x_i)^T \Delta x_i}$$

The incremental matrix is constructed based on the trim variable increments saved from previous interation, which could be $$\Delta x_i = \begin{bmatrix} \alpha_i - \alpha_{i-1} \\ \beta_i - \beta_{i-1} \\ \gamma_i - \gamma_{i-1} \\ \delta c_i - \delta c_{i-1} \\ \delta p_i - \delta p_{i-1} \\ \delta w_i - \delta w_{i-1} \end{bmatrix}$$

and the acceleration increments, which could be $$\Delta a_i = \begin{bmatrix} a_{X_i} - a_{X_{i-1}} \\ a_{Y_i} - a_{Y_{i-1}} \\ a_{Z_i} - a_{Z_{i-1}} \\ \dot{p}_i - \dot{p}_{i-1} \\ \dot{q}_i - \dot{q}_{i-1} \\ \dot{r}_i - \dot{r}_{i-1} \end{bmatrix}$$

Trim variable increments are determined using pivot Gaussian elimination, as indicated in block 308. This is the well-known matrix algebra process for determining a plurality of unknown values from a plurality of formulae.

The Jacobian matrix, acceleration increment, and acceleration norm are saved, as indicated in block 309, for revising the Jacobian matrix in the next iteration. The trim variables are updated as indicated in block 310.

Figure 4:
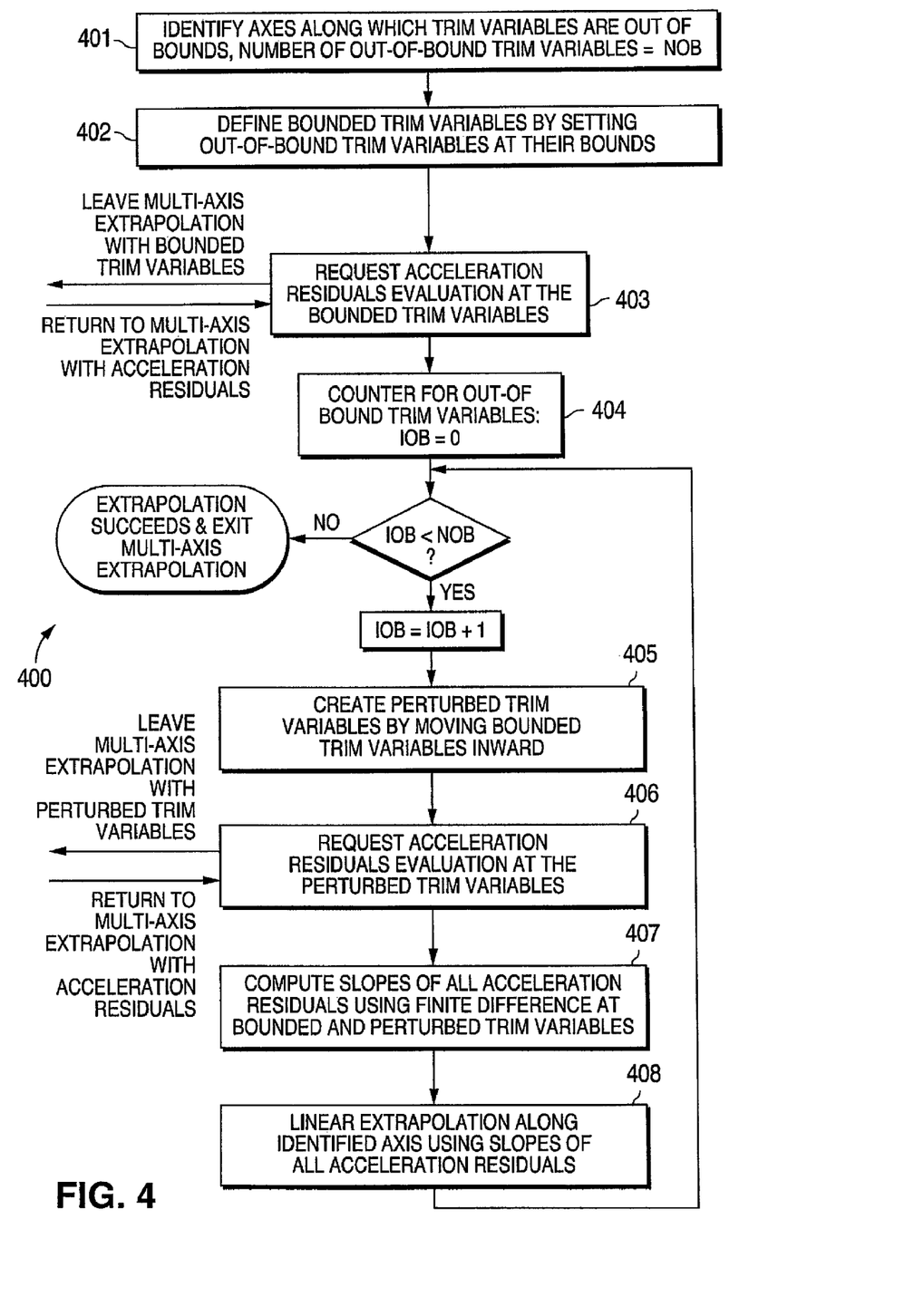
FIG. 4 shows a flow chart of the extrapolation process of FIGS. 2A and 2B.

FIG. 4 shows the multi-axis extrapolation 400 of FIGS. 2A and 2B in detail. The axes along which trim variables are out of bounds are determined, as indicated in block 401. Bounded trim variables are defined by setting out-of-bounds variables at their bounds, as indicated in block 402. Acceleration residuals evaluation is requested at the bounded trim variables, as indicated in block 403.

When the counter for out-of-bound trim variables (iob) reaches the number of out-of-bound trim variables (nob), then the extrapolation has succeeded and the extrapolation process is exited. As long as the counter for out-of-bound trim variables (iob) is less than the number of out-of-bound trim variables (nob), the following process continues.

Perturbed trim variables are created by moving bounded trim variables inward, as indicated by block 405. Acceleration residual evaluation at the perturbed trim variables is requested, as indicated in block 406. The slopes of all acceleration residuals are computed using finite difference at the bounded and perturbed variables, as indicated by block 407. Linear extrapolation is performed along the identified axis using the slopes of all acceleration residuals, as indicated in block 408.

Figure 5:
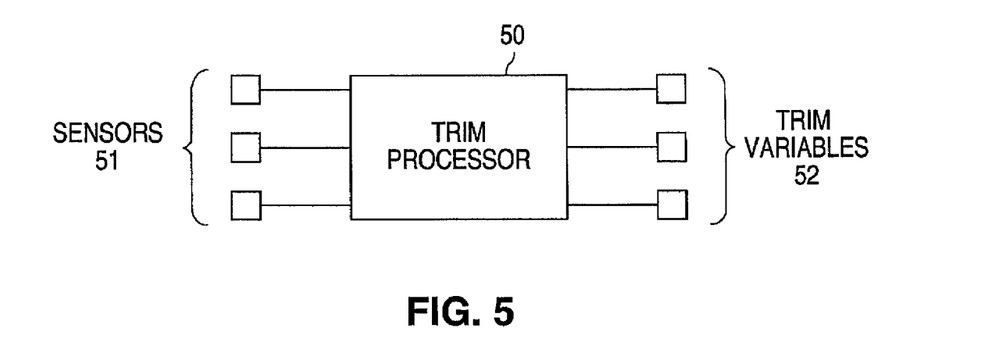
FIG. 5 shows a block diagram of a trim system, according to an example of an embodiment.

FIG. 5 shows a block diagram of a trim system, according to an example of an embodiment. A plurality of sensors 51 provide outputs to a trim processor 50. Trim processor 50 controls the position of trim variables 52.

Sensors 51 may comprise any sensors or other devices that provide information that may be used by trim processor 50 to determine trim values. For example, sensors 51 may comprise sensor that provide information representative of such parameters as current body components of linear and angular accelerations of the aircraft, and desired flight conditions described by altitude, speed, attitude and heading of the aircraft.

Trim processor 50 may be a dedicated processor or may be a generally purpose computer. Trim processor may comprise one or more algorithms that are run on a computer that performs a variety of other, non-related tasks.

Trim variables 52 may comprise main flight control surfaces, and the devices required to effect their movement (such as drive circuitry, electric motors, hydraulic pumps and motors). Trim processor 50, sensors 51, trim variables 52, can be part of a flight control augmentation system.

Although discussed herein as being applicable to aircraft, those skilled in the art will appreciate that one or more embodiments may be used to determine trim solutions for missiles, rockets, marine vessels (such as boats, ships, and submarines) and other vehicles. As such, discussion herein as being applicable to aircraft is by way of example only, and not by way of limitation.

Thus, one or more embodiments of the present provide a method and system for trimming and aircraft or other vehicle wherein the undesirable iterative aspects of contemporary trim systems are mitigated or eliminated. A more efficient and more robust trim system is thus provided.

Embodiments described are for purposes of illustration, not limitation. It should also be understood that numerous modifications and variations are possible in accordance with the principles described herein.

I claim:

1. A method for trimming a vehicle' control surfaces and propulsion system thrust to achieve or maintain a target state of the vehicle defined by its position, velocity and acceleration relative to a coordinate system, the method comprising:
using at least one sensor to determine the current state of the vehicle; and,
using at least one processor:
comparing the current state of the vehicle to the target state;
defining target values of linear and angular acceleration components of the vehicle, each expressed as a function of one or more trim variable, required to transform the state of the vehicle to or maintain it in the target state; and,
simultaneously determining trim values of all of the trim variables required to drive the current values of the linear and angular acceleration components of the vehicle to the target values thereof.

2. The method as recited in claim 1, wherein the vehicle comprises an aircraft.

3. The method as recited in claim 1, wherein the trim values are determined in six degrees of freedom.

4. The method as recited in claim 1, wherein at least one of the target accelerated components comprises a nonlinear function of the trim variables.

5. The method as recited in claim 1, wherein the determining comprises accounting for multi-axis coupling.

6. The method as recited in claim 1, further comprising providing at least some of the determined trim values to a flight control augmentation system.

7. The method as recited in claim 1, wherein the trim values are determined according to a p-beta control law.

8. The method as recited in claim 1, wherein the trim variables include one or more of angle of attack, angle of sideslip, speed, bank angle, drift angle, load factor, pitch control input, roll control input, yaw control input, engine throttle input, weight, and/or center of gravity of the vehicle.

9. The method as recited in claim 1, wherein the determining comprises determining bounds of the trim variables associated with boundaries of the flight envelope and at flight controls limits of the vehicle.

10. The method as recited in claim 1, wherein the determining comprises performing a multi-axis search for the trim values using one or more of
an initial Jacobian matrix construction with a finite difference, line search algorithm,
a Jacobian matrix with a Broyden update method,
a pivot Gaussian elimination method, and/or
a multi-axis extrapolation method.

11. A system for trimming a vehicle's control surfaces and propulsion system thrust to achieve or maintain a target state of the vehicles defined by its position, velocity and acceleration relative to a coordinate system, the system comprising:
at least one sensor operable to determine the current state of the vehicle; and,
at least one processor operable to:
compare the current state of the vehicle to the target state;
define target values of linear and angular acceleration components of the vehicle, each expressed as a function of one or more trim variables, required to transform the state of the vehicle to or maintain it in the target state; and,
simultaneously determine trim values of all of the trim variables required to drive the current values of the linear and angular acceleration components of the vehicle to the target values thereof.

12. The system as recited in claim 11, wherein the vehicle comprises an aircraft.

13. The system as recited in claim 11, wherein the at least one processor is operable to determine the trim values in six degree of freedom.

14. The system as recited in claim 11, wherein at least one of the target acceleration components comprises a nonlinear function of the trim variables.

15. The system as recited in claim 11, wherein the at least one processor is operable to account for multi-axis coupling in determining the trim values.

16. The system as recited in claim 11, wherein the at least one processor is further operable to provide at least some of the determined trim values to a flight control augmentation system.

17. The system as recited in claim 11, wherein the at least one processor is configured to determine the trim values according to p-beta control law.

18. The system as recited in claim 11, wherein the trim variables include one or more of angle of attack, angle of sideslip, speed, bank angle, drift angle, load factor, pitch control input, roll control input, yaw control input, engine throttle input, weight and/or center of gravity of the vehicle.

19. The system as recited in claim 11, wherein the at least one processor is operable to determine bounds of the trim variables associated with boundaries of the flight envelope and at flight control limits of the vehicle.

20. The system as recited in claim 11, wherein the at least one processor is operable to perform a multi-axis for the trim values using one or more of an initial Jacobian matrix construction with finite difference, line search algorithm,
a Jacobian matrix with a Broyden update method,
a pivot Gaussian elimination method, and/or
a multi-axis extrapolation method.

21. A system for trimming an aircraft's control surfaces and propulsion system thrust to achieve or maintain a target state of the aircraft defined by its position, velocity and acceleration relative to a coordinate system, the system comprising:

means for sensing the current state of the vehicle; and,
means for:
comparing the current state of the aircraft to the target state;
defining target values of linear and angular acceleration components of the vehicle, each expressed as a function of one or more trim variables, required to transform the state of the aircraft to or maintain it in the target state; and,
simultaneously determining trim values or all of the trim variable required to drive the current values of the linear and angular acceleration components of the vehicle to the target values thereof.

* * * * *